United States Patent
Kuwakino

(10) Patent No.: US 7,787,760 B2
(45) Date of Patent: Aug. 31, 2010

(54) LENS APERTURE-ADJUSTMENT DEVICE AND CLOSED CIRCUIT TELEVISION CAMERA

(75) Inventor: Koshi Kuwakino, Saitama (JP)

(73) Assignee: Fujinon Corporation, Saitama (JP)

( * ) Notice: Subject to any disclaimer, the term of this patent is extended or adjusted under 35 U.S.C. 154(b) by 474 days.

(21) Appl. No.: 11/729,802

(22) Filed: Mar. 30, 2007

(65) Prior Publication Data
US 2007/0230942 A1    Oct. 4, 2007

(30) Foreign Application Priority Data
Mar. 30, 2006    (JP) .................... P2006-094115

(51) Int. Cl.
*G03B 7/00*    (2006.01)
(52) U.S. Cl. .................... 396/223; 396/259; 348/363
(58) Field of Classification Search ............ 396/66, 396/259, 427, 428, 219, 238, 257, 223; 348/143, 348/224.1, 362, 363, 366, 221.1
See application file for complete search history.

(56) References Cited

U.S. PATENT DOCUMENTS

| 4,300,167 A | 11/1981 | Miller et al. |
| 4,399,466 A | 8/1983 | Stephenson |
| 4,427,996 A * | 1/1984 | Tamura .................. 348/229.1 |
| 4,562,477 A | 12/1985 | Ogasawara et al. |
| 4,591,919 A * | 5/1986 | Kaneda et al. ............. 348/348 |
| 4,954,897 A * | 9/1990 | Ejima et al. .............. 348/229.1 |
| 5,057,927 A * | 10/1991 | Hieda ....................... 348/363 |
| 5,148,281 A | 9/1992 | Nakamura et al. |
| 5,505,535 A * | 4/1996 | Kawasaki et al. ............. 396/91 |
| 7,068,318 B2 * | 6/2006 | Arai ......................... 348/362 |

FOREIGN PATENT DOCUMENTS

| JP | 5-86707 B2 | 12/1993 |
| JP | 6-42720 B2 | 6/1994 |

* cited by examiner

*Primary Examiner*—Christopher E Mahoney
*Assistant Examiner*—Linda B Smith
(74) *Attorney, Agent, or Firm*—Birch, Stewart, Kolasch & Birch, LLP

(57) ABSTRACT

A lens aperture-adjustment device of a closed circuit television camera for capable of switching between automatic and manual adjustments of lens aperture is provided. The device includes a geared motor for driving aperture blades of a lens aperture mechanism; a drive circuit for driving the geared motor in response to a first drive signal for automatic adjustment or a second drive signal for manual adjustment; a comparison circuit for making a comparison between a lightness information signal responsive to the imaging environment and a first reference signal and outputting the first drive signal; a differential amplifier to which a manual adjustment signal entered by an operator and a second reference signal for defining the limit value of the drive amount of the geared motor are input, the differential amplifier for outputting the second drive signal; and a selection circuit for connecting the first drive signal or the second drive.

2 Claims, 5 Drawing Sheets

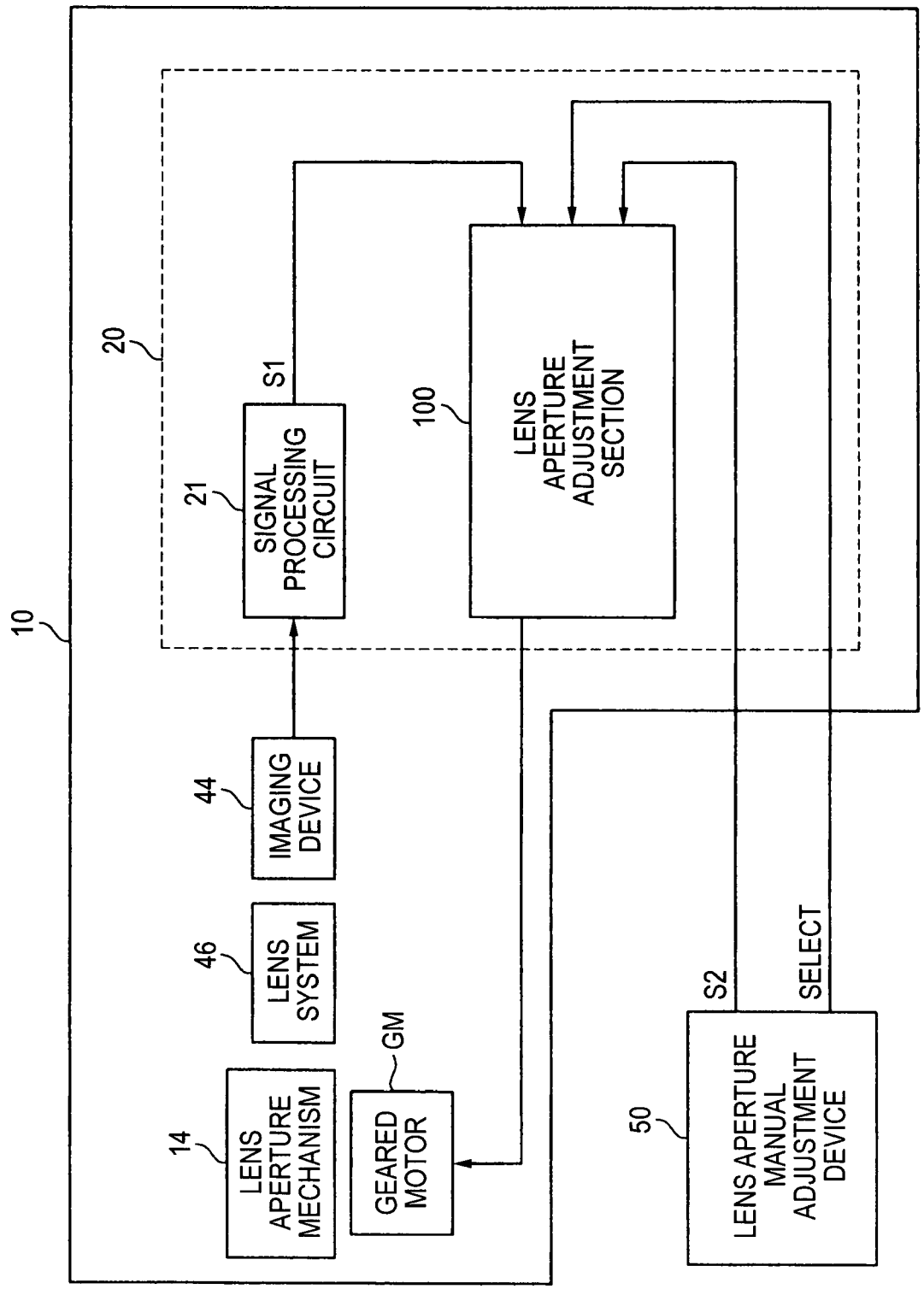

LENS APERTURE-ADJUSTMENT DEVICE AND CLOSED CIRCUIT TELEVISION CAMERA

BACKGROUND OF THE INVENTION

1. Field of the Invention

This invention relates to a lens aperture-adjustment device for a closed circuit television camera and a closed circuit television camera.

2. Description of Related Art

Closed circuit television (CCTV) is transmission of a video signal so as to enable a person permitted to view to selectively receive the video signal in a predetermined closed range (namely, on the closed circuit) rather than transmission of a video signal to an indefinite number of persons like a TV broadcast. Systems using the CCTV include a crime prevention system (security system) using a camera installed in a convenience store, a street, a parking lot, etc., a monitor system of a factory line, and the like. Particularly, a security camera and a monitor camera used in the CCTV system are called CCTV cameras.

The CCTV camera is installed not only in facilities, but also outdoors as on the street, in a parking lot, etc, and picks up an image of an object at any time of day or night and thus needs adjustment of a lens aperture in response to the lightness of the imaging environment. To save a person watching an image picked up by the CCTV camera (who will be hereinafter referred to as "watchperson" from having to adjusting the lens aperture in response to change in the environment, most of the currently installed CCTV cameras have a function of automatically making a lens aperture adjustment based on the lightness of the imaging environment.

While lens aperture adjustment of the CCTV camera is made automatically, the watchperson might want to make a manual lens aperture adjustment. Thus, a lens aperture-adjustment device of a CCTV camera for enabling the user to switch between automatic adjustment and manual adjustment of lens adjustment is demanded. For example, JP-B-5-86707 and JP-B-6-42720 listed below disclose each a lens aperture-adjustment device of a CCTV camera for enabling the user to switch between automatic adjustment and manual adjustment of lens aperture adjustment:

A lens aperture of a CCTV camera is implemented as follows: A plurality of plates of metal, etc., called aperture blade are used in combination to form a roughly circular hole and the aperture blades are moved, thereby changing the diameter of the hole. Generally, as the number of the aperture blades increases, the hole becomes close to a circle and the accuracy of the lens aperture, namely, the accuracy of the quantity of light input to the CCTV camera in response to the imaging environment is enhanced.

However, a lens aperture-adjustment device of a CCTV camera according to the related art for enabling the user to switch between automatic adjustment and manual adjustment of lens aperture (which will be hereinafter referred to as "related art device") uses a galvanometer as a motor for moving aperture blades and thus only two to three aperture blades can be moved at the same time. Thus, the related art device cannot provide the accuracy of the lens aperture at the required level of the current society.

To move the aperture blades, the related art device needs feedback control involved in the aperture position using an aperture position detection element and/or aperture speed using a tachogenerator, and an additional position feedback circuit and speed feedback circuit become required.

Further, to enable the user to switch between automatic adjustment and manual adjustment of lens aperture, the related art device needs to be provided with a plurality of switches and must control the switches.

SUMMARY OF THE INVENTION

An object of an illustrative, non-limiting embodiment of the present invention is to a lens aperture-adjustment device of a CCTV camera of a simple configuration for enabling the user to switch between automatic adjustment and manual adjustment of lens aperture with a motor controlled under open loop control, and to provide a CCTV camera including the lens aperture-adjustment device.

According to one aspect of the invention, there is provided a lens aperture-adjustment device of a closed circuit television camera for enabling switching between automatic adjustment and manual adjustment of a lens aperture mechanism, the lens aperture-adjustment device including a geared motor for driving aperture blades of the lens aperture mechanism; a drive circuit for driving the geared motor in response to a first drive signal for automatic adjustment or a second drive signal for manual adjustment; a comparison circuit for making a comparison between a lightness information signal of an imaging environment, which may be acquired by a lightness information acquisition device for acquiring lightness information, and a first reference signal corresponding to target lightness, and outputting a first drive signal for automatic adjustment for determining the drive amount of the geared motor for driving the lens aperture blades so as to cancel out the difference between the lightness information signal and the first reference signal; a differential amplifier to which a manual adjustment signal entered by an operator and a second reference signal responsive to the manual adjustment signal for defining the limit value of the drive amount of the geared motor are input, the differential amplifier for outputting a second drive signal for manual adjustment in a range not exceeding the limit value; and a selection circuit for connecting either the first drive signal or the second drive signal to the drive circuit for driving the geared motor.

According to the configuration, a lens aperture-adjustment device changes the aperture diameter produced by the aperture blades by driving the aperture blades of the lens aperture mechanism with the geared motor for realizing lens adjustment. The lightness information signal of the imaging environment, acquired by the lightness information acquisition device, and the first reference signal corresponding to the target lightness are input to the comparison circuit, which then makes a comparison between the lightness information signal and the first reference signal. If the lightness information signal is larger than the first reference signal, the comparison circuit outputs the first drive signal for automatic adjustment for determining the drive amount of the geared motor for lessening the aperture diameter as the difference is canceled out. If the lightness information signal is smaller than the first reference signal, the comparison circuit outputs the first drive signal for automatic adjustment for determining the drive amount of the geared motor for enlarging the aperture diameter as the difference is canceled out. The manual adjustment signal entered by the operator and the second reference signal for defining the limit value of the drive amount of the geared motor are input to the differential amplifier, which then differentially amplifies the manual adjustment signal and the second reference signal responsive to the manual adjustment signal, thereby outputting the second drive signal for manual adjustment in the range not exceeding the limit value of the drive amount of the geared motor, namely, matched with the first drive signal for automatic adjustment in the signal level. The selection circuit connects either the first drive signal for automatic adjustment or the second drive signal for manual adjustment to the drive circuit, whereby it is made possible to switch between automatic adjustment and manual adjustment of the lens aperture mechanism in such a manner that if the drive circuit operates with the first drive circuit, automatic adjustment of the lens aperture mechanism is made and that if the drive circuit operates with the second drive circuit, manual adjustment of the lens aperture mechanism is made.

According to one aspect of the invention, there is provide a closed circuit television camera including: a lens; a lens aperture mechanism; an imaging device; and the lens aperture-adjustment device.

BRIEF DESCRIPTION OF THE DRAWINGS

The features of the invention will appear more fully upon consideration of the exemplary embodiment of the invention, which are schematically set forth in the drawings, in which:

FIG. 5 is a block diagram to show an overview of a signal flow in lens aperture adjustment of the closed circuit television camera for enabling the user to switch between automatic adjustment and manual adjustment of lens aperture according to an exemplary embodiment of the invention.

DETAILED DESCRIPTION OF THE EXEMPLARY EMBODIMENTS

Figure 1:
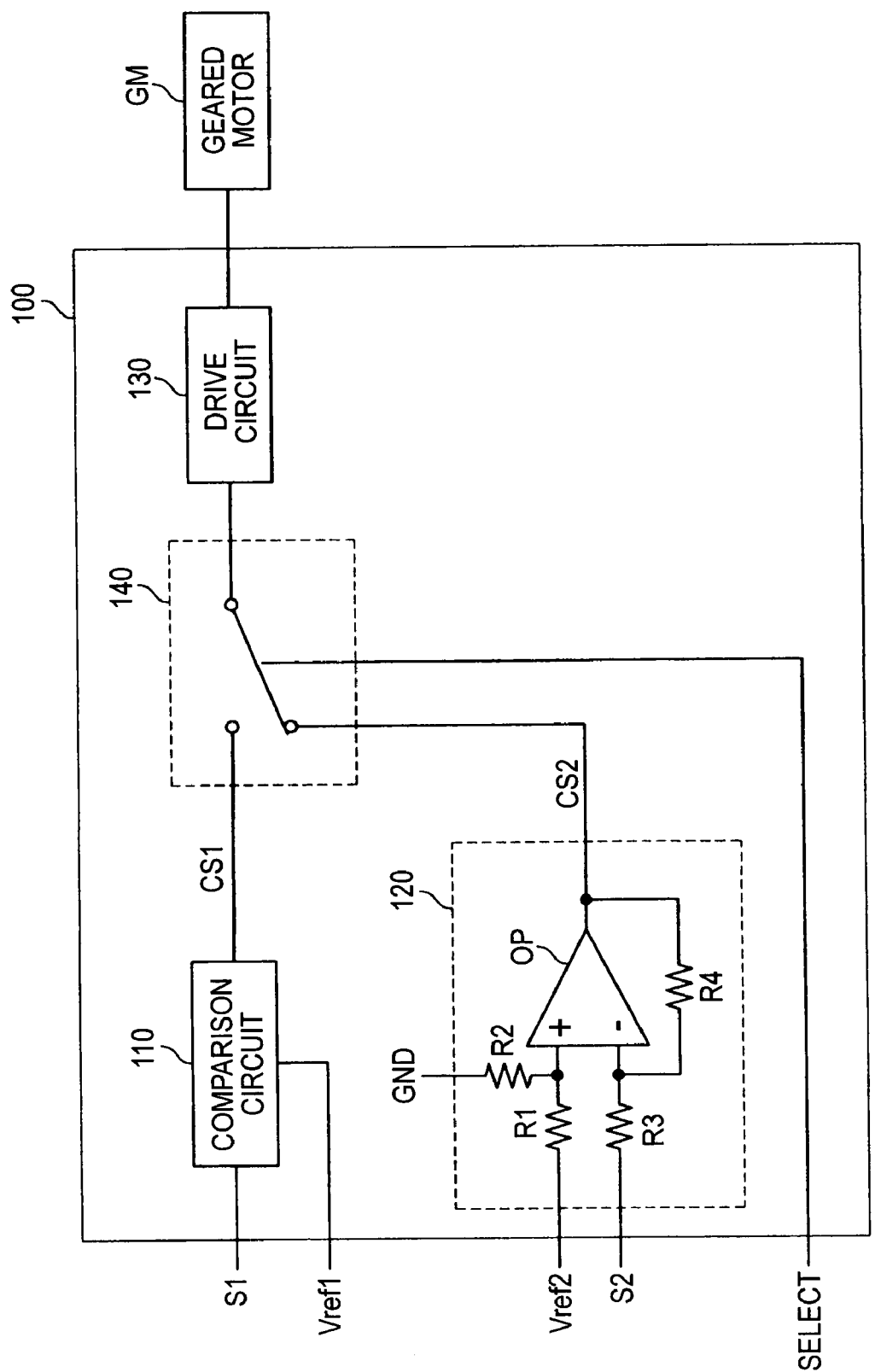
FIG. 1 is a block diagram to show a lens aperture-adjustment device of a closed circuit television camera for enabling the user to switch between automatic adjustment and manual adjustment of lens aperture according to an exemplary embodiment of the invention.

Although the invention will be described below with reference to the exemplary embodiments thereof, the following exemplary embodiments and modifications do not restrict the invention.

According to an exemplary embodiment of the invention, the geared motor that can move a large number of aperture blades at the same time with larger output than that of a motor using a galvanometer used with the related art device is controlled under open loop control and one selection circuit and one differential amplifier are included, thereby providing the lens aperture-adjustment device of the CCTV camera for enabling the user to switch between automatic adjustment and manual adjustment in the simple configuration having aperture accuracy more than that of the related art device.

An exemplary embodiment of the invention will be discussed in detail with reference to the accompanying drawings. Components having substantially the same function are denoted by the same reference numeral in the Specification and the accompanying drawings and will not be discussed duplicately.

Figure 2:
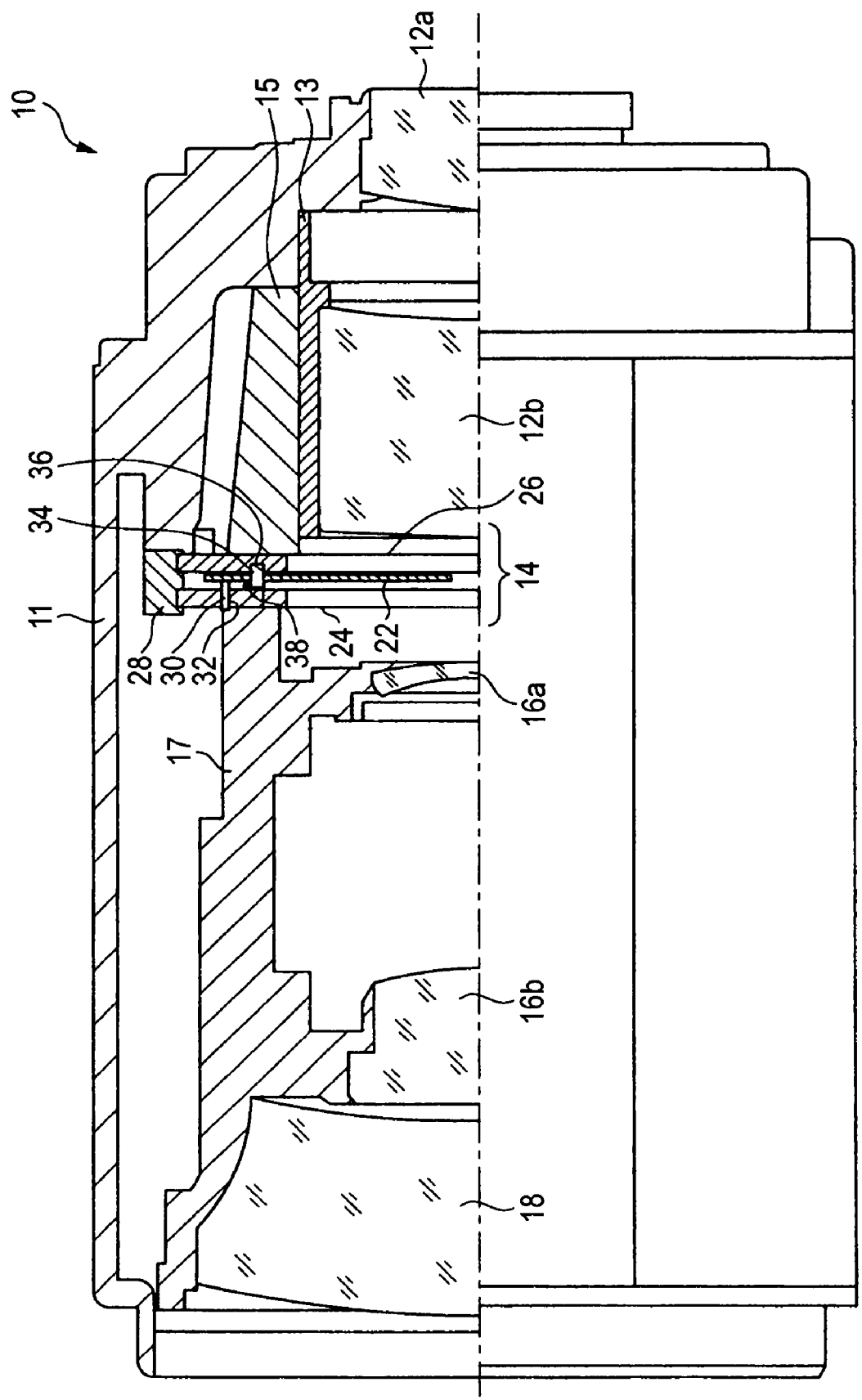
FIG. 2 is a fragmentary sectional view to show a mechanism included in the a closed circuit television camera according to an exemplary embodiment of the invention.

FIG. 2 is a fragmentary sectional view to show a mechanism included in a CCTV camera 10 according to an exemplary embodiment of the invention.

The CCTV camera 10 includes in a CCTV camera cabinet 11, master-system lens assemblies 12a and 12b, a support part 13 for supporting the master-system lens assembly 12b, a lens aperture mechanism 14 arranged in parallel with the master-system lens assembly 12b for controlling the quantity of light input to the master-system lens assemblies 12a and 12b, a support part 15 for supporting the lens aperture mechanism 14, zoom-system lens assemblies 16a and 16b, a focus-system lens assembly 18, a support part 17 for supporting the zoom-system lens assemblies 16a and 16b and the focus-system lens assembly 18, and a CCTV camera drive section 20 (see FIG. 5) for driving the lens assemblies. The lens aperture mechanism 14 includes aperture blades 22, a retaining ring 24, an inner clip washer 26, a hinge shaft 30, a bearing hole 32, a guide hole 36, a dowel pin 34, and an elastic member 38 in an aperture frame 28. The configuration of the lens aperture mechanism 14 is described later.

Figure 3:
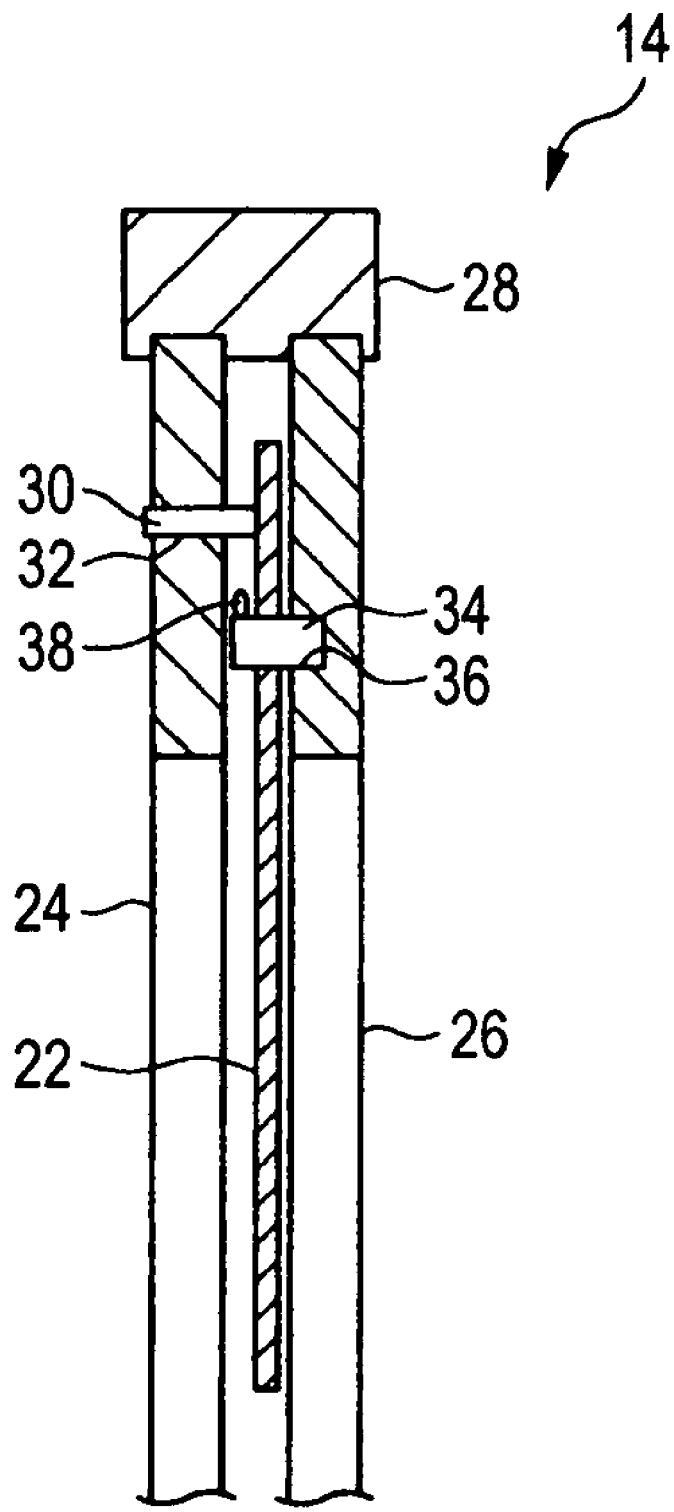
FIG. 3 is a sectional view of the main part of a lens aperture mechanism contained in the closed circuit television camera shown in FIG. 2.
Figure 4:
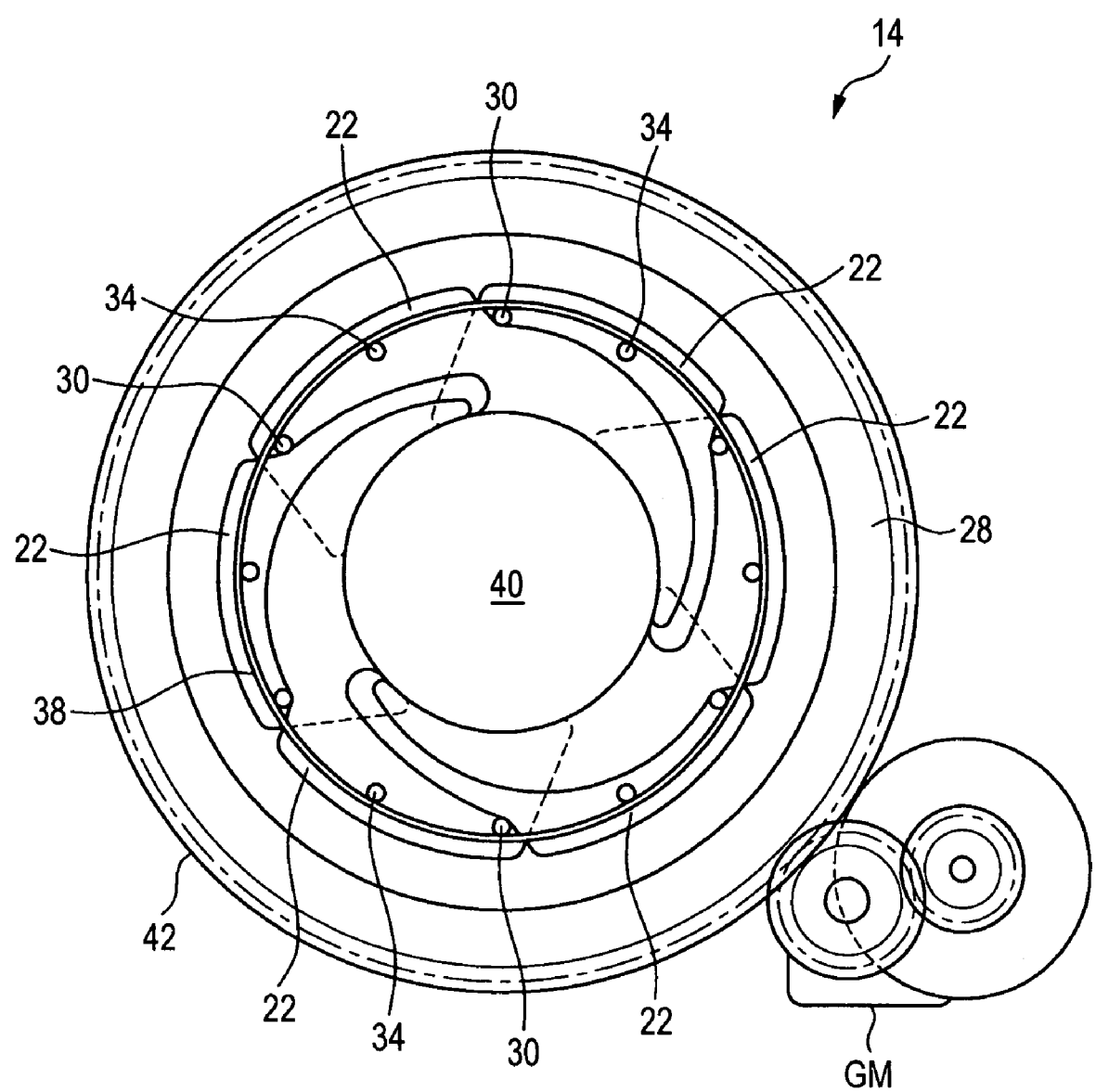
FIG. 4 is a schematic representation to show the lens aperture mechanism of the closed circuit television camera according to an exemplary embodiment of the invention.

Although the CCTV camera 10 has various functions such as a zoom function, a focus function, and an aperture function as described above, a lens aperture-adjustment device according to the embodiment of the invention relates closely to the aperture function and therefore the lens aperture mechanism 14 involved in the aperture function and the CCTV camera drive section 20 involved in driving the lens aperture mechanism 14 will be discussed below:

FIG. 3 is a sectional view of the main part of the lens aperture mechanism 14 contained in the CCTV camera 10 in FIG. 2, and FIG. 4 is a schematic representation to show the lens aperture mechanism 14 of the CCTV camera according to the embodiment of the invention.

As shown in FIG. 4, the lens aperture mechanism 14 includes six aperture blades 22 in the aperture frame 28. As shown in FIG. 3, in the lens aperture mechanism 14, each of the aperture blades 22 is placed between the retaining ring 24 and the inner clip washer 26 and is fitted by means of the hinge shaft 30 inserted into the bearing hole 32 piercing the retaining ring 24 and the dowel pin 34 inserted into the guide hole 36 on the inner clip washer 26. The lens aperture mechanism 14 may include the elastic member 38 of rubber, etc., for pressing and urging the dowel pin.

To each of the aperture blades 22, power corresponding to the drive amount of a geared motor GM arranged in parallel with the aperture frame 28 is transmitted through power transmission means 42 contained in the lens aperture mechanism 14 for moving each of the aperture blades 22 along the guide hole 36. The lens aperture mechanism 14 of the CCTV camera according to the embodiment of the invention changes the size of an aperture diameter 40 produced by the six aperture blades 22 in accordance with the operation of the six aperture blades 22, thereby making it possible to control the quantity of light input to the master-system lens assemblies 12a and 12b in such a manner that if the size of the aperture diameter 40 is increased, the quantity of light input to the master-system lens assemblies 12a and 12b grows and that if the size of the aperture diameter 40 is lessened, the quantity of light input to the master-system lens assemblies 12a and 12b decreases.

For example, a gear can be named as the power transmission means 42 in FIG. 4. However, the power transmission means is not limited to a gear if it can move the aperture blades 22 based on drive of the geared motor GM; the designer can set any desired manner in which power is transmitted to the aperture blades 22. Here, the number of the aperture blades 22 involved in the lens aperture mechanism 14 is six by way of example, but is not limited and any number of aperture blades can be set.

As described above, lens aperture adjustment of the CCTV camera 10 according to the embodiment of the invention is made by controlling drive of the geared motor GM for changing the aperture diameter 40 produced by a plurality of aperture blades 22 to a large or small size.

FIG. 5 is a block diagram to show an overview of a signal flow in the lens aperture adjustment of the CCTV camera 10 for enabling the user to switch between automatic adjustment and manual adjustment of lens aperture according to the embodiment of the invention.

When light of the quantity responsive to the imaging environment is introduced into the inside of the CCTV camera 10 through the lens aperture mechanism 14 and the lens system, an imaging device 44 of a sensor, etc., using a CCD (Charge Coupled Device) or a CMOS (Complementary Metal Oxide Semiconductor) acting as a lightness information acquisition device converts the input light quantity into a signal. The signal provided by the imaging device 44 becomes a lightness information signal S1 responsive to the imaging environment through a signal processing circuit 21 contained in the CCTV camera drive section 20 and the lightness information signal S1 is input to a lens aperture adjustment section 100. The imaging device 44 is not limited to a sensor using a CCD or a CMOS and any of various devices can be applied as the imaging device 44 if it can transfer charges generated in photoelectric conversion.

If the watchperson operates a lens aperture adjustment knob (not shown) included in a lens aperture manual adjustment device 50 installed on the outside of the CCTV camera 10, a switch signal SELECT for switching the lens aperture operation of the CCTV camera 10 from automatic adjustment to manual adjustment and a manual adjustment signal S2 responsive to the operation of the adjustment knob are input to the lens aperture adjustment section 100. As the switch signal SELECT is input to the lens aperture adjustment section 100, the lens aperture adjustment section 100 switches from automatic adjustment to manual adjustment. At this time, even if any signal is input to the lens aperture adjustment section 100 as the lightness information signal S1, drive control of the geared motor GM based on the lightness information signal S1 is not performed and drive control of the geared motor GM based on the manual adjustment signal S2 is performed.

Thus, the lens aperture-adjustment device according to the embodiment of the invention can realize manual adjustment of lens aperture by making it possible to perform drive control of the geared motor GM based on the manual adjustment signal S2. The lens aperture manual adjustment device 50 may be formed as a separate device from the CCTV camera 10 or may be formed as contained in the CCTV camera 10. The switch signal SELECT for switching the lens aperture operation of the CCTV camera 10 from automatic adjustment to manual adjustment need not necessarily be synchronized with the operation of the lens aperture adjustment knob; for example, the lens aperture manual adjustment device may be provided with a manual adjustment changeover switch and the manual adjustment changeover switch may be switched to the manual operation position, thereby inputting the switch signal SELECT to the lens aperture adjustment section 100 asynchronously with the manual adjustment signal S2. Further, the device operated by the watchperson to adjust the lens aperture is not limited to the lens aperture adjustment knob, needless to say.

As described above, the lightness information signal S1 and/or the manual adjustment signal S2 and the switch signal SELECT are input to the lens aperture adjustment section 100. The lens aperture-adjustment device according to the embodiment of the invention drives the geared motor GM based on the lightness information signal S1 or the manual adjustment signal S2 for realizing automatic adjustment or manual adjustment of the lens aperture.

Next, the lens aperture adjustment section 100 for driving the geared motor GM based on the lightness information signal S1 or the manual adjustment signal S2 will be discussed.

FIG. 1 is a block diagram to show the lens aperture-adjustment device of the CCTV camera for enabling the user to switch between automatic adjustment and manual adjustment of lens aperture according to the embodiment of the invention.

Referring to FIG. 1, the lens aperture-adjustment device according to the embodiment of the invention is made up of the lens aperture adjustment section 100 and the geared motor GM, and the lens aperture adjustment section 100 includes a comparison circuit 110, a differential amplifier 120, a selection circuit 140, and a drive circuit 130.

The lightness information signal S1 and a first reference signal Vref1 are input to the comparison circuit 110. The first reference signal Vref1 is a signal used as the reference for determining the lens adjustment operation in such a manner that if the lightness information signal S1 is larger than the first reference signal Vref1, the lens is stopped down and that if the lightness information signal S1 is smaller than the first reference signal Vref1, the lens is opened, for example. Stopping down the lens is synonymous with lessening the aperture diameter 40 produced by a plurality of aperture blades 22, namely, decreasing the quantity of light input to the master-system lens assemblies 12a and 12b. Opening the lens is synonymous with enlarging the aperture diameter 40 produced by a plurality of aperture blades 22, namely, increasing the quantity of light input to the master-system lens assemblies 12a and 12b.

The comparison circuit 110 makes a comparison between the lightness information signal S1 and the first reference signal Vref1 and outputs a first drive signal CS1 for automatic adjustment for driving the geared motor GM so as to cancel out the difference between the lightness information signal S1 and the first reference signal Vref1.

The differential amplifier 120 is a differential amplification circuit made up of resistors R1, R2, R3, and R4 and an operational amplifier OP. The manual adjustment signal S2 and a second reference signal Vref2 are input to the differential amplifier 120, and one end of the differential amplifier 120 is connected to ground GND. The second reference signal Vref2 is a reference signal for defining the upper limit of the output of a second drive signal CS2 for manual adjustment output from the differential amplifier 120.

The output of the differential amplifier 120 is determined based on the input manual adjustment signal S2 and second reference signal Vref2 and the value of the resistors R1, R2, R3, and R4. Since the drive circuit 130 is designed so as to correspond to the first drive signal CS1 for automatic adjustment, it is also considered that the second drive signal CS2 output from the differential amplifier 120 becomes a signal at a level destroying the drive circuit 130 depending on the magnitude of the manual adjustment signal S2 and/or the value setting of the resistors R1, R2, R3, and R4. Thus, the second reference signal Vref2 responsive to the manual adjustment signal S2 is input to the differential amplifier 120, thereby controlling the upper limit of the output of the signal amplified and output by the operational amplifier OP, namely, the second drive signal CS2 for manual adjustment output from the differential amplifier 120. Accordingly, the upper limit of the second drive signal CS2 can be matched with the first drive signal CS1 and destruction of the drive circuit 130 caused by the second drive signal CS2 can be prevented.

The selection circuit 140 is implemented as a switch. If the switch signal SELECT is not input, the selection circuit 140 connects the drive circuit 130 and the comparison circuit 110 for allowing the first drive signal CS1 for automatic adjustment to be input to the drive circuit 130.

If the switch signal SELECT is input, the selection circuit 140 connects the drive circuit 130 and the differential amplifier 120 for allowing the second drive signal CS2 for manual adjustment to be input to the drive circuit 130.

Thus, the selection circuit 140 connects either the first drive signal CS1 or the second drive signal CS2 to the drive circuit 130 in response to the switch signal SELECT; the switching in the selection circuit 140 is not limited to switching based on whether or not the switch signal SELECT is applied. For example, if the switch signal SELECT is an analog signal, the switching may be performed in response to the magnitude of the analog signal.

The signal output from the selection circuit 140, namely, the first drive signal CS1 or the second drive signal CS2 is input to the drive circuit 130, which then drives the geared motor GM based on the signal output from the selection circuit 140. The drive circuit 130 does not perform feedback control involved in the position or the speed of the geared motor GM and drives the geared motor GM under open loop control.

As described above, the lens aperture-adjustment device according to the embodiment of the invention controls the geared motor GM under open loop control based on either the first drive signal CS1 for automatic adjustment or the second drive signal CS2 for manual adjustment for moving the aperture blades 22 at the same time and changes the size of the aperture diameter 40 produced by the aperture blades 22, thereby making lens aperture adjustment.

The lens aperture adjustment section 100 contained in the lens aperture-adjustment device includes one selection circuit 140 and one differential amplifier 120 and enables either the first drive signal CS1 for automatic adjustment or the second drive signal CS2 for manual adjustment for driving the geared motor GM, thereby realizing switching between automatic adjustment and manual adjustment of lens aperture.

As described above, according to the embodiment of the invention, the geared motor GM that can move a large number of aperture blades 22 at the same time is controlled under open loop control and one selection circuit 140 and one differential amplifier 120 are included, thereby providing the lens aperture-adjustment device of the CCTV camera for enabling the user to switch between automatic adjustment and manual adjustment in the simple configuration having high aperture accuracy as compared with that of the related art device.

Although the preferred embodiments of the invention have been described with reference to the accompanying drawings, the invention is not limited to the specific embodiments, needless to say. Those skilled in the art will recognize that various change examples or modified examples of such embodiments exist. Such change examples or modified examples are intended to be within the scope of the invention and the appended claims.

For example, FIG. 5 shows only one lens aperture manual adjustment device, but it is to be understood by those skilled in the art that modification of inputting a manual adjustment signal and a switch signal from each of a plurality of lens aperture manual adjustment devices not necessarily installed at the same location for switching between automatic adjustment and manual adjustment of lens aperture will be apparent to those skilled in the art and belongs to the equivalent scope of the invention.

This application claims foreign priority from Japanese Patent Application No. 2006-94115, filed Mar. 30, 2006, the entire disclosure of which is herein incorporated by reference.

What is claimed is:

1. A lens aperture-adjustment device enabling switching between automatic adjustment and manual adjustment of a lens aperture mechanism, the lens aperture-adjustment device comprising:
    a geared motor that drives aperture blades of the lens aperture mechanism;
    a drive circuit that drives the geared motor in response to one of a first drive signal for automatic adjustment and a second drive signal for manual adjustment;
    a comparison circuit that makes a comparison between a lightness information signal of an imaging environment and a first reference signal corresponding to a target lightness and outputs the first signal for determining a drive amount of the geared motor for driving the aperture blades so as to cancel out a difference between the lightness information signal and the first reference signal;
    a differential amplifier to which a manual adjustment signal and a second reference signal responsive to the manual adjustment signal for defining a limit value of a drive amount of the geared motor are input, the differential amplifier outputting the second drive signal in a range not exceeding the limit value; and
    a selection circuit that selects and outputs one of the first drive signal and the second drive signal to the drive circuit.

2. A closed circuit television camera comprising:
a lens;
a lens aperture mechanism;
an imaging device; and
a lens aperture-adjustment device according to claim 1.

* * * * *